(12) United States Patent
Homme et al.

(10) Patent No.: US 6,262,422 B1
(45) Date of Patent: Jul. 17, 2001

(54) RADIATION DETECTION DEVICE AND METHOD OF MAKING THE SAME

(75) Inventors: Takuya Homme; Toshio Takabayashi; Hiroto Sato, all of Hamamatsu (JP)

(73) Assignee: Hamamatsu Photonics K.K., Shizuoka-ken (JP)

( * ) Notice: Subject to any disclaimer, the term of this patent is extended or adjusted under 35 U.S.C. 154(b) by 0 days.

(21) Appl. No.: 09/247,299

(22) Filed: Feb. 10, 1999

Related U.S. Application Data

(63) Continuation-in-part of application No. PCT/JP98/00551, filed on Feb. 12, 1998.

(30) Foreign Application Priority Data

Feb. 14, 1997 (JP) .................................................. 9-030510

(51) Int. Cl.⁷ ................................................ G01T 1/202
(52) U.S. Cl. .............................. 250/370.11; 250/370.09; 250/367
(58) Field of Search ....................... 250/370.11, 370.09, 250/367, 483.1

(56) References Cited

U.S. PATENT DOCUMENTS

| | | | |
|---|---|---|---|
| 4,066,908 | * 1/1978 | Farukhi et al. | 250/483.1 |
| 4,181,856 | * 1/1980 | Bone | 250/370.09 |
| 4,948,978 | 8/1990 | Guyot | 250/370.11 |
| 4,982,095 | 1/1991 | Takahashi et al. | 250/367 |
| 5,041,729 | * 8/1991 | Takahashi et al. | 250/367 |
| 5,066,861 | * 11/1991 | Nakayama et al. | 250/370.09 |
| 5,132,539 | 7/1992 | Kwasnick et al. | 250/361 |
| 5,179,284 | 1/1993 | Kingsley et al. | 250/370.11 |
| 5,227,635 | 7/1993 | Iwanczyk | 250/370.12 |
| 5,276,329 | 1/1994 | Hughes | 250/370.11 |
| 5,401,668 | * 3/1995 | Kwasnick et al. | 250/370.11 |
| 5,463,224 | * 10/1995 | Burstein et al. | 250/370.11 |
| 5,464,984 | * 11/1995 | Cox et al. | 250/370.11 |
| 5,641,984 | 6/1997 | Aftergut et al. | 257/433 |
| 5,707,880 | 1/1998 | Aftergut et al. | 437/3 |

FOREIGN PATENT DOCUMENTS

| | | |
|---|---|---|
| 0 337 826 | 10/1989 | (EP) . |
| 560871 | 3/1993 | (JP) . |
| 5-196742 | 8/1993 | (JP) . |
| 5-242841 | 9/1993 | (JP) . |
| 5-312961 | 11/1993 | (JP) . |
| 5-333353 | 12/1993 | (JP) . |

OTHER PUBLICATIONS

Journal of Polymer Science: part A–1, vol. 4, 3027–3039 (1966) "A new general synthetic method for the preparation of linear poly–p–xylylenes", william F. gorham, pp. 3027–3039 (This document is based on the attached Japanese "Technical News" document.

* cited by examiner

Primary Examiner—Constantine Hannaher
Assistant Examiner—Otilia Gabor
(74) Attorney, Agent, or Firm—Pillsbury Winthrop LLP

(57) ABSTRACT

Light-receiving devices are two-dimensionally arranged on a substrate, bonding pads electrically connected to the light-receiving devices in the respective rows or columns via signal lines are arranged on the outer periphery of the substrate, and a protective passivation film is disposed on the light-receiving devices and signal lines, thereby forming a light-receiving device array. On the light-receiving surface of the light-receiving device array, a scintillator made of columnar crystals of CsI is deposited. On the other hand, a resin frame formed like an elongated frame is disposed inside the bonding pads. Inside this frame, a protective film in which an inorganic film is held between organic films made of Parylene is laminated. The outer periphery of the protective film is in close contact with the resin frame with the aid of the coating resin.

10 Claims, 5 Drawing Sheets

RADIATION DETECTION DEVICE AND METHOD OF MAKING THE SAME

RELATED APPLICATIONS

This is a continuation-in-part of Application Ser. No. PCT/JP98/00551 filed on Feb. 12, 1998, now pending.

BACKGROUND OF THE INVENTION

1. Field of the Invention

The present invention relates to a radiation detection device; and, in particular, to a radiation detection device having a light-receiving portion with a large area, which is used for medical X-raying and the like.

2. Related Background Art

While X-ray sensitive films have conventionally been used for medical and industrial X-raying, radiation imaging systems using a radiation detection device are becoming pervasive due to their convenience and the storability of their photographed results. Such a radiation imaging system uses a radiation detection device having a plurality of pixels so as to acquire, as an electric signal, two-dimensional image data formed by a radiation, and processes thus obtained with a signal processing unit, so as to display it on a monitor. A typical radiation detection device is configured such that a scintillator is disposed on one- or two-dimensionally arranged photodetectors so as to convert the incident radiation into light, which is then detected.

Cesium Iodide (CsI), a typical scintillator material, is a hygroscopic material which dissolves by absorbing vapor (moisture) in the air. As a result, characteristics of the scintillator, such as resolution in particular, have disadvantageously deteriorated.

One radiation detection device having a structure for protecting the scintillator against moisture is the technique disclosed in Japanese Patent Application Laid-Open No. 5-196742. In this technique, a water-impermeable moisture-proof barrier is formed on the upper side of the scintillator layer, thereby protecting the scintillator against moisture.

SUMMARY OF THE INVENTION

In the above-mentioned technique, however, it is hard for the moisture-proof barrier in the outer peripheral portion of the scintillator layer to come into close contact with the substrate of the radiation detection device. For example, in a radiation detection device having a large area used for chest X-raying or the like, due to its long outer peripheral portion, there is a fear of peeling off the moisture-proof barrier. Hence, the hermetic sealing of the scintillator layer might become incomplete, moisture penetrates into the scintillator layer, it might cause a problem that deteriorates characteristics of the scintillator layer.

Also, the above-mentioned technique discloses a method of making a moisture seal layer for the moisture-proof barrier in which a silicone potting material or the like is coated on the scintillator layer in a liquid state or coated inside a window member disposed on the light-receiving surface side of the radiation detection device and then the window member is disposed on the scintillator layer before the moisture seal layer is dried, thereby fixing the moisture seal layer. In this method, it is hard to uniformly form the moisture seal layer on a scintillator layer having an irregular surface form, whereby adhesion may deteriorate. This phenomenon tends to occur in radiation detection devices having a large area, in particular.

In view of the foregoing problems, it is an object of the present invention to provide a radiation detection device having a uniform protective film, which is easy to make, for protecting the scintillator against moisture; and a method of making the same.

In order to achieve this object, the radiation detection device of the present invention comprises: (1) a light-receiving device array in which a plurality of light-receiving devices are one- or two-dimensionally arranged on a substrate to form a light-receiving portion, and a plurality of bonding pads electrically connected to the light-receiving devices in respective rows or columns of the light-receiving portion are disposed outside the light-receiving portion; (2) a scintillator layer, deposited on the light-receiving devices of the light-receiving portion, for converting a radiation into detectable light with the light-receiving device; (3) one or a plurality of resin frames made of a resin each formed like a closed frame surrounding said scintillator layer or said bonding pads; and (4) a radiation-transmittable, moisture-resistant protective film covering at least the scintillator layer and reaching above the resin frame so as to expose at least the bonding pad portion.

As a consequence, the incident radiation is converted into detectable light with the light-receiving device by the scintillator layer. As the resulting light image is detected by the one- or two-dimensionally arranged light-receiving devices, an image electric signal corresponding to the incident radiation image is obtained. The scintillator layer has a characteristic of deteriorating by absorbing moisture. In the present invention, however, since the scintillator layer is covered with the moisture-resistant protective film, which is in close contact with the light-receiving device array with the aid of the resin frame, the scintillator layer is completely hermetically sealed so as to be isolated from the external atmosphere, thus being protected against vapor in the air. Further, the bonding pad portion for connection with an external circuit is exposed.

A coating resin for covering an edge of the moisture-resistant protective film along the resin frame may further be provided. In this case, the edge of the moisture-resistant protective film is held between the resin frame and coating resin from the upper and lower sides, so as to be firmly bonded.

On the other hand, the method of making a radiation detection device in accordance with the present invention comprises: (1) forming a light-receiving portion by one- or two-dimensionally arranging a plurality of light-receiving devices and a plurality of bonding pads electrically connected to the light-receiving devices in respective rows or columns of the light-receiving portion are disposed outside the light-receiving portion on a substrate, and depositing a scintillator layer for converting a radiation into detectable light with the light-receiving device thereon; (2) forming one or a plurality of resin frames one the light-receiving device array with a resin each forming a closed frame surrounding the scintillator layer or bonding pads; (3) forming a radiation-transmittable, moisture-resistant protective film enveloping the light-receiving device array as a whole; and (4) cutting the moisture-resistant protective film along a longitudinal direction of the resin frame and removing the moisture-resistant protective film on the bonding pad portion so as to expose the bonding pad portion.

As the moisture-resistant protective film is formed such as to envelope the light-receiving device array as a whole, the adhesion between the scintillator layer and the moisture-resistant protective film improves, thereby forming a uniform film. As the moisture-resistant protective film is removed from the bonding pad portion after being formed, the bonding pad portion is securely exposed. The resin frame formed under the protective film adds a margin to the cut-in depth of a cutter when cutting the protective film. Further, the resin frame brings edges of the protective film into close contact with the substrate, thereby assuring the sealing.

A step of covering and bonding an edge of the moisture-resistant protective film along the resin frame with a resin may further be provided after these steps. In this case, the edge of the moisture-resistant protective film is held between the resin frame and this resin so as to be firmly bonded.

The moisture-resistant protective film may be a single layer organic film or a multilayer film made of at least two layers including an organic film laminated thereon.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a top plan view showing an embodiment of the present invention, whereas

FIG. 12 is a top plan view showing another embodiment of the present invention, whereas

DESCRIPTION OF THE PREFERRED EMBODIMENTS

Figure 1:
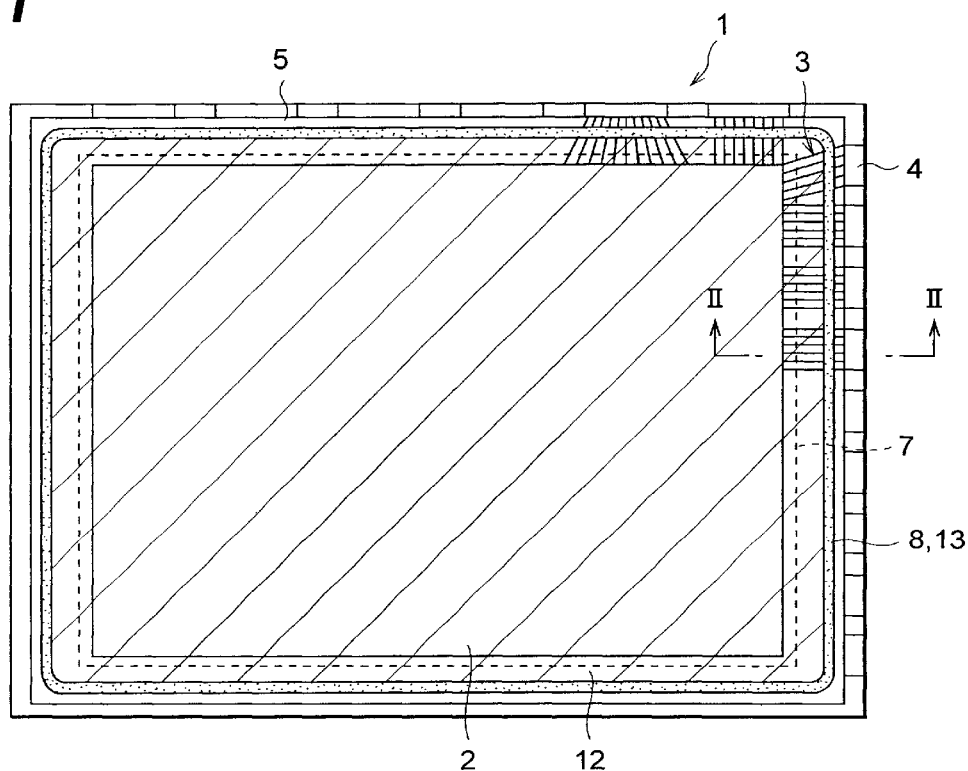

In the following, preferred embodiments of the present invention will be explained with reference to the drawings. To facilitate the comprehension of the explanation, the same reference numerals denote the same parts, where possible, throughout the drawings, and a repeated explanation will be omitted. Also, the dimensions and forms in each drawing are not always identical to those in practice but include parts exaggerated to facilitate understanding.

Figure 2:
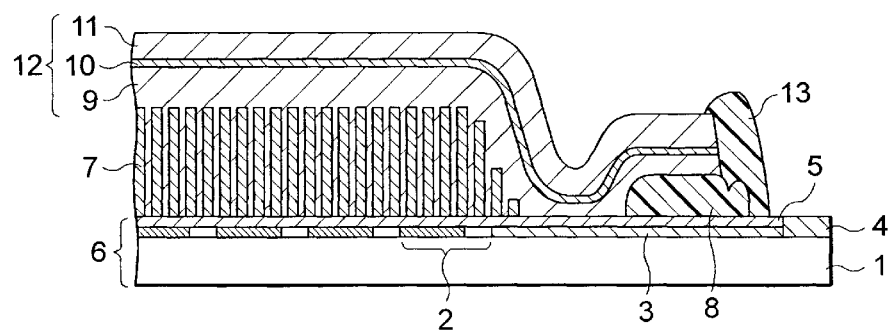
FIG. 2 is an enlarged sectional view thereof taken along the line II—II.
Figure 3:
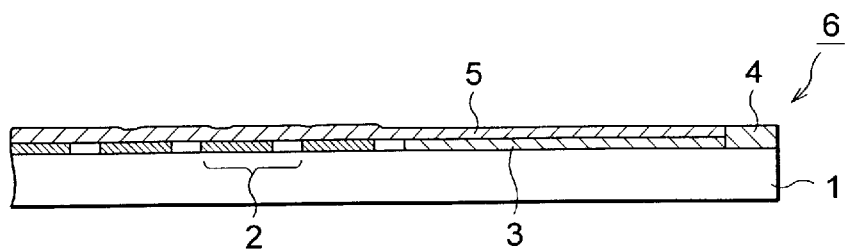
FIGS. 3 to 11 are views showing manufacturing steps of the embodiment in accordance with FIGS. 1 and 2.

FIG. 1 is a top plan view showing an embodiment of the present invention, whereas FIG. 2 is an enlarged sectional view of its outer peripheral portion taken along the line II—II.

First, the configuration of this embodiment will be explained with reference to FIGS. 1 and 2. On an insulating substrate 1, such as that made of glass, for example, light-receiving devices 2 for effecting photoelectric conversion are arranged two-dimensionally, so as to form a light-receiving portion. Each light-receiving device 2 is constituted by a photodiode (PD) made of amorphous silicon or a thin-film transistor (TFT). The light-receiving devices 2 in the respective rows or columns are electrically connected to each other via signal lines 3 for reading out signals. A plurality of bonding pads 4 for taking out signals to an external circuit (not shown) are disposed along outer peripheral sides, e.g., two adjacent sides, of the substrate 1 and are electrically connected to their corresponding plurality of light-receiving devices 2 via the signal lines 3. An insulating passivation film 5 is formed on the light-receiving devices 2 and signal lines 3. For the passivation film 5, silicon nitride or silicon oxide is preferably used. On the other hand, the bonding pads 4 are exposed for connection with the external circuit. In the following, this substrate and the circuit portion on the substrate are referred to as a light-receiving device array 6.

Formed on the light-receiving portion of the light-receiving device array 6 is a scintillator 7, having a columnar structure, for converting an incident radiation into visible light. Though various materials can be used for the scintillator 7, Tl-doped CsI or the like, which has a favorable emission efficiency, is preferable. A resin frame 8 formed like an elongated frame from a resin is disposed at a position inside the bonding pads, so as to surround the outer periphery of the light-receiving device array 6. As this resin frame 8, KJR651 or KE4897 manufactured by Shin-Etsu Chemical Co., Ltd., TSE397 manufactured by Toshiba Silicone Co., Ltd., and DYMAX625T manufactured by Sumitomo 3M Ltd., which are silicone resins, and the like are preferably used. This is because they are widely used for surface processing for mechanically and electrically protecting semiconductor devices and exhibit high adhesion to a protective film 12 formed on the upper side which will be explained later.

Laminated on the scintillator 7 inside the frame of the resin frame 8 are a first organic film 9, an inorganic film 10, and a second organic film 11, each transmitting X-rays therethrough but blocking vapor, thereby forming a protective film 12.

As the first organic film 9 and the second organic film 11, a poly-para-xylylene resin (manufactured by Three Bond Co., Ltd.; trade name: Parylene), such as poly-para-chloroxylylene (manufactured by the same company; trade name: Parylene C) in particular, is preferably used. The coating film made of Parylene has excellent characteristics suitable for the organic films 9, 11 in that, for example, it transmits therethrough only a very small amount of vapor and gasses, has high water repellency and chemical resistance, exhibits excellent electrical insulation even in a thin film, and is transparent to radiation and visible light. The details of the coating with Parylene are described in Three Bond Technical News (issued Sep. 23, 1992), and their characteristics will be noted here.

Parylene can be coated by chemical vapor deposition (CVD) method in which it is vapor-deposited on a support in vacuum as with the vacuum vapor deposition of metals. This method comprises thermally decomposing p-xylene, which is a raw material, and rapidly cooling the resulting product in an organic solvent such as toluene or benzene, so as to yield di-para-xylylene which is known as dimer; thermally decomposing this dimer so as to generate a stable radical para-xylylene gas; and causing thus generated gas to be absorbed and polymerized on a material so as to form a poly-para-xylylene film having a molecular weight of about 500,000 by polymerization.

The pressure at the time of Parylene vapor deposition is 0.1 to 0.2 torr, which is higher than the pressure in the case of metal vacuum vapor deposition, 0.001 torr. Upon vapor deposition, a monomolecular film covers the whole material to be coated, and then Parylene is vapor-deposited thereon. Consequently, a thin film having a thickness as small as 0.2 $\mu$m can be formed with a uniform thickness in the state free of pinholes. Therefore, the coating on acute angle portions, edge portions, and narrow gaps of the order of microns, which has been impossible in the liquid form, can be effected. Also, the coating can be effected at a temperature close to room temperature, without needing heat treatment and the like at the time of coating. As a consequence, mechanical stress or thermal distortion accompanying hardening would not occur, and the coating is excellent in stability as well. Further, coating is possible with respect to almost any solid material.

For the inorganic film 10, various materials such as those transparent, opaque, or reflective to visible light can be used as long as they can transmit X-rays therethrough. Oxidized films of Si, Ti, and Cr, and metal thin films of gold, silver, aluminum, and the like can be used. In particular, a film reflective to visible light is preferably used, since it is effective in preventing fluorescence generated in the scintillator 7 from leaking out, thereby enhancing sensitivity. Here, an example using Al which is easy to shape will be explained. Though Al itself is likely to corrode in the air, the inorganic film 10 is protected against corrosion since it is held between the first organic film 9 and the second organic film 11.

While this protective film 12 is formed by the above-mentioned Parylene coating, for example, by CVD method, the film 12 is configured to cover the whole surface of the light-receiving device array 6. Therefore, in order to expose the bonding pads 4, the protective film 12 formed by the Parylene coating can be cut inside the bonding pads 4, and the outer part of the protective film 12 can be removed. As will be mentioned later, when the protective film 12 is cut near substantially the center of the frame portion of the resin frame 8, the outer peripheral portion of the protective film 12 would may be fixed by the resin frame 8, whereby the protective film 12 can be prevented from peeling off from the outer peripheral portion. Further, the outer peripheral portion of the protective film 12, together with the resin frame 8 thereunder, is coated with a coating resin 13. For the coating resin 13, a resin which favorably adheres to the protective film 12 and resin frame 8, such as WORLD ROCK No. 801-SET2 (70,000 cP type) manufactured by Kyoritsu Chemical Industries Co., Ltd., which is an acrylic adhesive, for example, is preferably used. This resin adhesive is hardened in about 20 seconds upon UV irradiation at 100 mW/cm$^2$. Thus hardened coating film is soft but has a sufficient strength, is excellent in resistances to moisture, water, galvanic corrosion, and migration, favorably adheres to various materials such as glass, plastics, and the like in particular, and thus has favorable characteristics as the coating resin 13. Alternatively, the same silicone resin as the resin frame 8 may be used. Also, the same acrylic adhesive as the coating resin 13 may be used for the resin frame 8.

Figure 4:
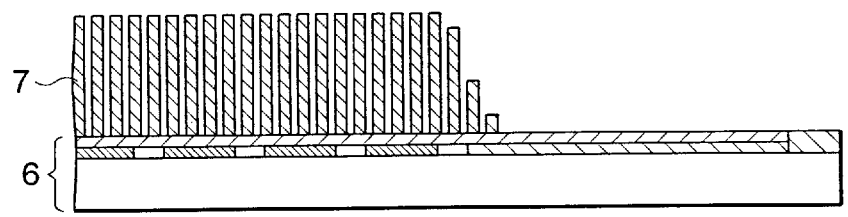

The manufacturing process of this embodiment will now be explained with reference to FIGS. 3 to 11. As shown in FIG. 4, columnar crystals of Tl-doped CsI are grown according to vapor deposition method by a thickness of 600 μm on the light-receiving surface of the light-receiving device array 6 shown in FIG. 3, so as to form a layer of the scintillator 7.

Figure 5:
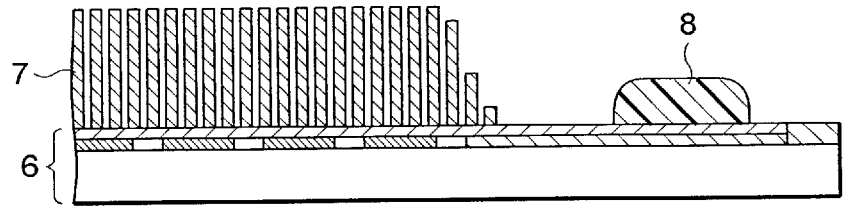

On the other hand, as shown in FIG. 5, between the respective outer peripheries of the light-receiving portion and light-receiving device array, the resin frame 8 is formed like an elongated frame having a width of 1 mm and a height of 0.6 mm on the passivation film 5 inside the bonding pads 4 along the outer perimeter of the light-receiving portion. For forming this frame, for example, an automatic X-Y coating apparatus such as AutoShooter-3 manufactured by Iwashita Engineering Ltd. is preferably used. At this time, for further improving the adhesion to the first organic film 9 formed on the upper side, it will be more preferable if the surface of the resin frame 8 is subjected to a rough-surface treatment. Examples of the rough-surface treatment include scoring and forming a number of small depressions on the surface.

Figure 6:
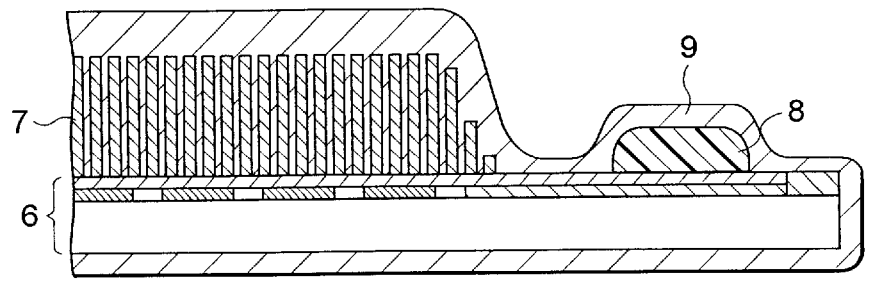

CsI, which forms the layer of scintillator 7 is highly hygroscopic, so that it dissolves by absorbing vapor in the air when left exposed. In order to prevent this phenomenon from occurring, as shown in FIG. 6, CVD method is used for enveloping the whole substrate with Parylene at a thickness of 10 μm, thereby forming the first organic film 9. Though there are gaps among the columnar crystals of CsI, Parylene intrudes into these narrow gaps to some extent, whereby the first organic film 9 comes into close contact with the scintillator layer 7. Further, the Parylene coating yields a precision thin film coating with a uniform thickness on the layer of scintillator 7 having irregularities. Since Parylene can be formed by CVD at a lower vacuum than in the case with the metal vapor deposition and at normal temperature as mentioned above, it can be processed easily.

Figure 7:
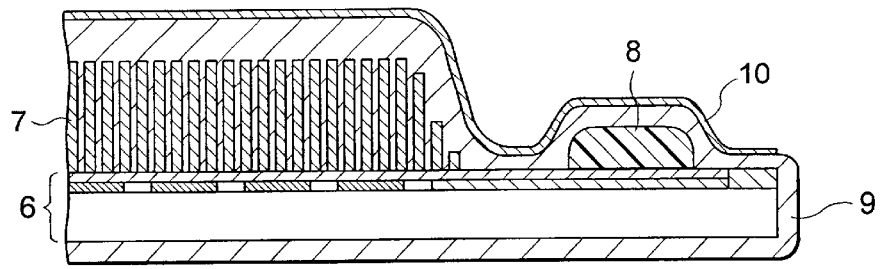
Figure 8:
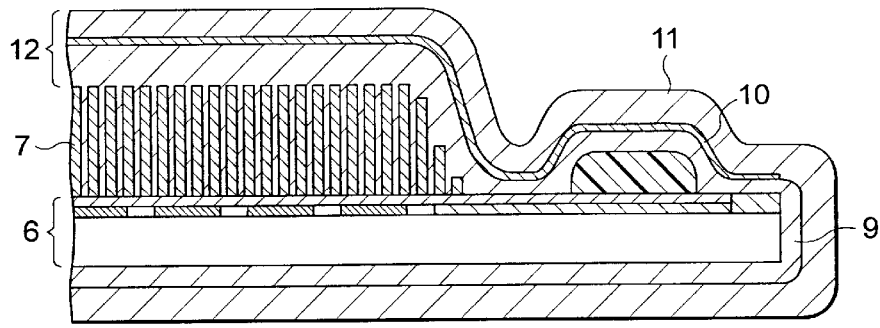

Further, as shown in FIG. 7, an Al film having a thickness of 0.2 μm is laminated on the surface of the first organic film 9 on the entrance side by vapor deposition method, thus forming the inorganic film 10. Then, by using CVD method again, the surface of the whole substrate is coated with Parylene at a thickness of 10 m, thereby forming the second organic film 11 (see FIG. 8). This second organic film 11 prevents the inorganic film 10 from deteriorating due to corrosion.

Figure 9:
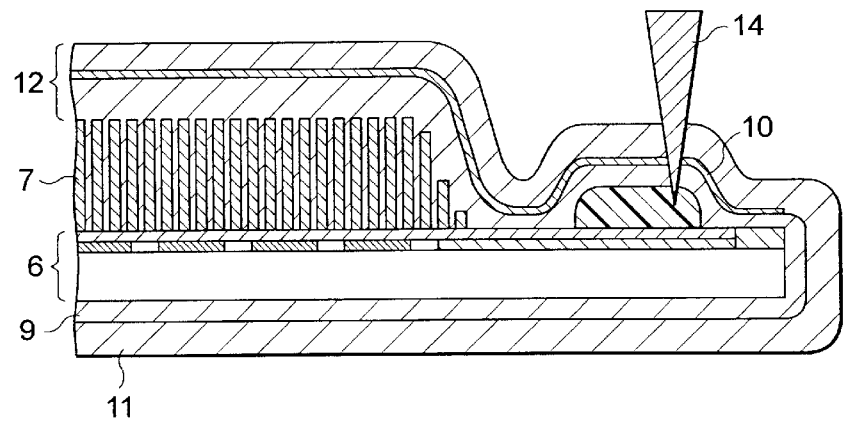
Figure 10:
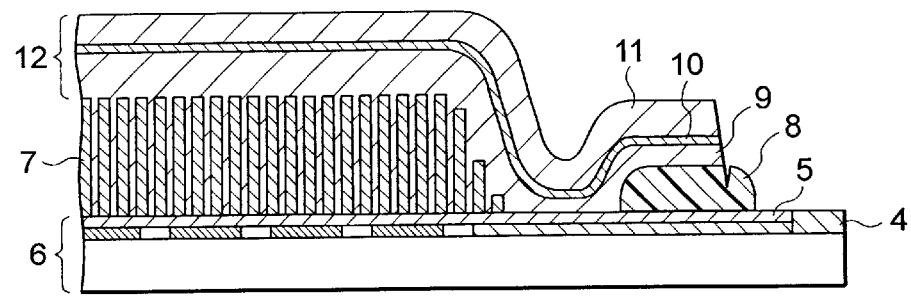
Figure 11:
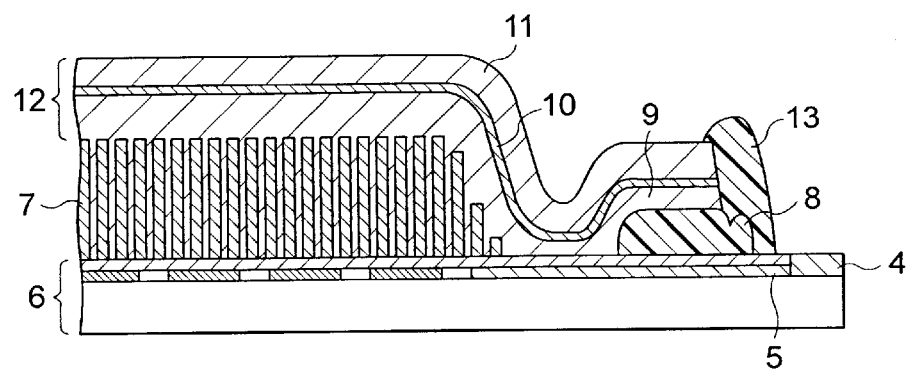

Thus formed protective film 12 is cut with a cutter 14 along the longitudinal direction of the resin frame 8 (see FIG. 9). Since the resin frame 8 forms a protrusion, the cut portion is easily confirmed. Also, since the thickness of the resin frame 8 forms a margin for inserting the cutter 14, there is no fear of the signal lines 3 under the resin frame 8 being damaged. Hence, the processing becomes easier, thereby improving the yield of the product. Thereafter, from thus cut portion, the parts of the protective film 12 on the outer side thereof and the rear side of the entrance surface are removed, so as to expose the bonding pads 4 for connection with the external circuit (see FIG. 10). Thereafter, the outer peripheral portion of the protective film 12 and the exposed resin frame 8 are coated and covered with a coating resin 13, which is then hardened upon UV irradiation (see FIG. 11).

In general, the passivation film 5 and the first organic film 9 do not adhere to each other well. In accordance with the configuration of this embodiment, however, since the resin frame 8 adapted to closely adhere to both of the first organic film 9 and the passivation film 5 is disposed therebetween, the first organic film 9 comes into close contact with the passivation film 5 with the aid of the resin frame 8. Though the protective film 12 will closely adhere to the light-receiving device array 6 with the aid of the resin frame 8 even if the coating resin 13 is not provided, the coating resin 13 is preferably formed since the protective film 12 including the first organic film 9 would be fixed thereby as being held between the resin frame 8 and the coating resin 13, thus further improving the adhesion of the protective film 12 onto the light-receiving device array 6. As a consequence, the scintillator 7 is hermetically sealed with the protective film 12, whereby moisture can securely be prevented from intruding into the scintillator 7, thus making it possible to keep the resolution of device from decreasing due to the deterioration of the scintillator 7 caused by moisture absorption.

The operation of this embodiment will now be explained with reference to FIGS. 1 and 2. An incident X-ray (radiation) from the entrance surface side is transmitted through all of the first organic film 9, inorganic film 10, and second organic film 11, so as to reach the scintillator 7. This X-ray is absorbed by the scintillator 7, which radiates visible light in proportion to the dose of the X-ray. Of thus radiated visible light, the part directed opposite to the incident direction of the X-ray is transmitted through the second organic film 11 so as to be reflected by the inorganic film 10. As a consequence, substantially all the visible light generated by the scintillator 7 is made incident on the light-receiving device 2 by way of the passivation film 5. Hence, efficient detection can be effected.

In each light-receiving device 2, an electric signal corresponding to the light quantity of the visible light is generated by photoelectric conversion and is stored for a predetermined period of time. Since the light quantity of the visible light corresponds to the dose of the incident X-ray, the electric signal stored in each light-receiving device 2 corresponds to the dose of the incident X-ray, whereby an image signal corresponding to an X-ray image is obtained. The image signals stored in the light-receiving devices 2 are sequentially read out from the bonding pads 4 via the signal lines 3, transferred to the outside, and processed in a predetermined processing circuit, whereby the X-ray image can be displayed.

Though the foregoing explanation relates to the protective film 12 having a configuration in which the inorganic film 10 is held between the first and second organic films 9, 11 made of Parylene, the first organic film 9 and the second organic film 11 may be made of materials different from each other. Also, when a material highly resistant to corrosion is used for the inorganic film 10, the second organic film 11 per se may be omitted.

Though an example in which the resin frame 8 and the coating resin 13 are formed on the passivation film 5 outside the part formed with the light-receiving devices 2 is explained here, it will be difficult to form the resin frame 8 at a boundary portion between the light-receiving device 2 and the bonding pad 4 if they are located close to each other. For securely exposing the bonding pad 4 and securely coating the periphery of the protective film 12 with the coating resin 13, it is preferred that the positions of the resin frame 8 and coating resin 13 be shifted toward the light-receiving device 2. To this end, the scintillator 7 is not formed on the whole surface on the light-receiving devices 2 but on the light-receiving devices 2 in the effective screen area excluding the pixels near the bonding pads 4. Then, after the resin frame 8 is formed outside the effective screen area, i.e., on the ineffective pixels, the protective film 12 is formed so as to cover the formed layer of scintillator 7 as a whole and reach the resin frame 8. Thereafter, the protective film 12 is cut along the longitudinal direction of the resin frame 8, the part of the protective film 12 outside the effective screen area is removed, and then the edges of the protective film 12 are coated with the coating resin 13 along the resin frame 8. In this case, since the pixels near the bonding pads 4 are covered with the resin frame 8 and the coating resin 13 or are free of the scintillator 7 on the front side, their sensitivity to the radiation decreases. As a result, these pixels are unusable, thus reducing the number of effective pixels and effective screen area in the light-receiving devices 2. When the light-receiving devices 2 constitute a large screen and have a large number of pixels in total, however, the ratio of the ineffective pixels is small and, depending on the configuration of devices, they may yield a merit that manufacturing becomes easier.

Figure 12:
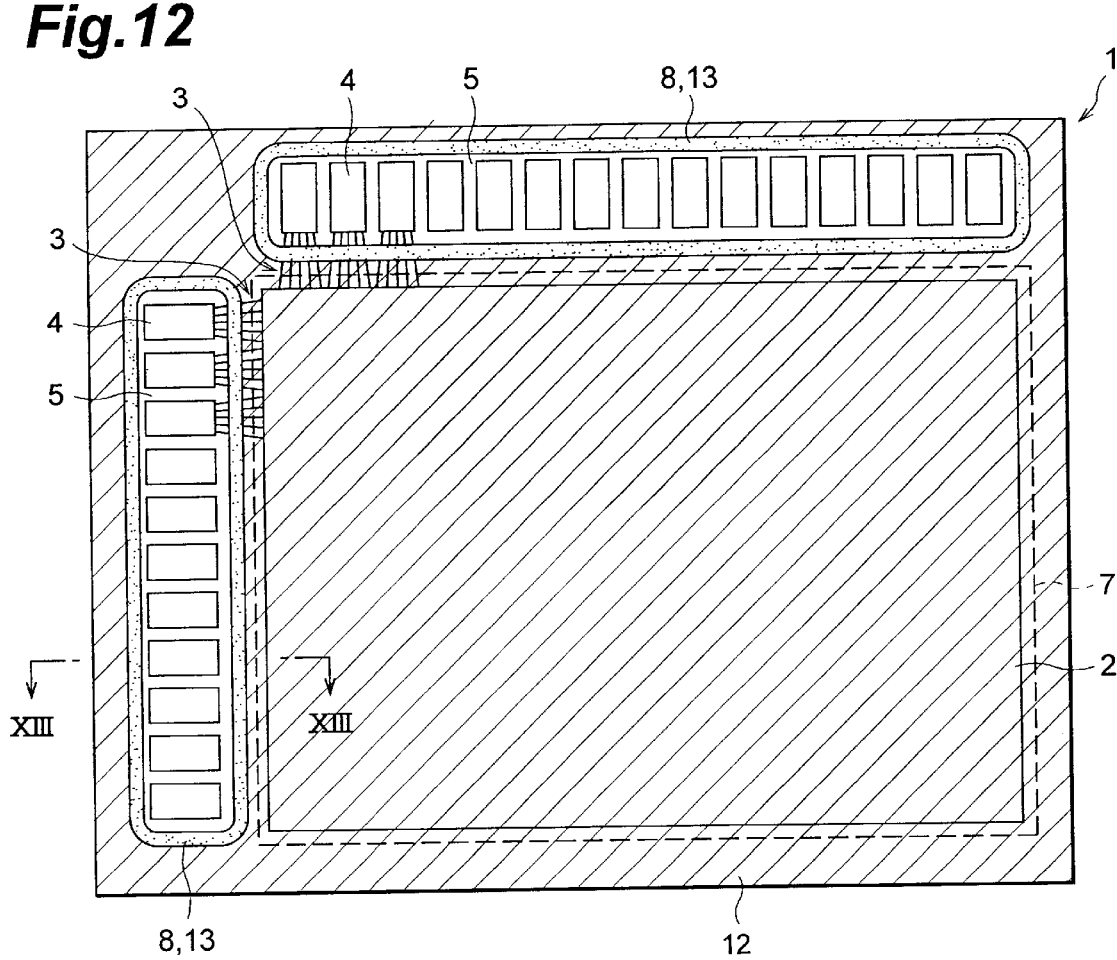
Figure 13:
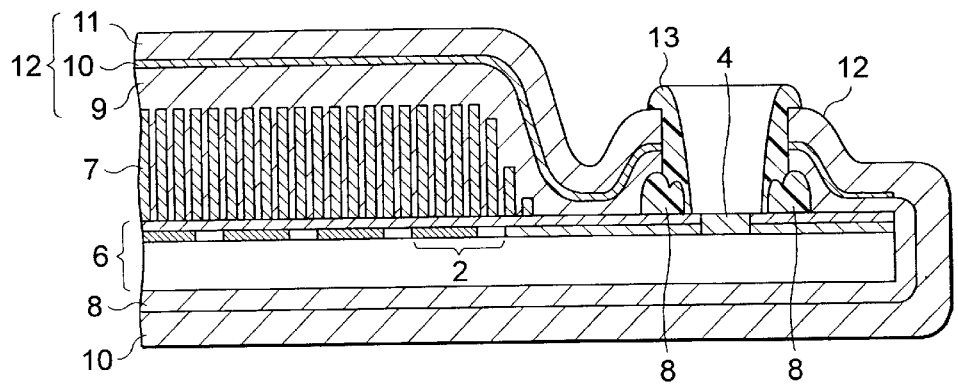
FIG. 13 is an enlarged sectional view thereof taken along the line XIII—XIII.

With reference to FIGS. 12 and 13, another embodiment of the present invention will now be explained. FIG. 12 is a top plan view of the radiation detection device in accordance with this embodiment, whereas FIG. 13 is an enlarged sectional view thereof taken along the line XIII—XIII. Since the basic configuration of this device is basically the same as that of the embodiment shown in FIGS. 1 and 2, only their differences will be explained in the following.

In the embodiment shown in FIGS. 12 and 13, the protective film 12 is formed on the whole surface of the light-receiving device array 6 on the light-receiving surface side and the rear side, exposing only the bonding pad array 4 portion. The resin frame 8 is formed such as to surround the exposed bonding pad array 4 portion, and the coating resin 13 is coated on the resin frame 8 along the boundaries (edges) of the protective film 12. Since the bonding pad 4 portion is securely exposed, and the protective film 12 securely adheres to the light-receiving device array 6 with the aid of the resin frame 8 and coating resin 13, the layer of scintillator 7 is hermetically sealed, whereby it can be prevented from deteriorating due to moisture absorption in this embodiment as well.

This embodiment is effective in that it can reduce the length of the edge portion acting as a boundary portion which may cause the protective film to peel off, in particular, in the case of CCD or MOS type imaging devices in which the bonding pad portion 4 is small.

Further, though the foregoing explanation relates to so-called surface entrance type radiation detection devices in which radiation is incident thereon from the scintillator side on light-receiving devices, the present invention is also applicable to so-called rear face entrance type radiation detection devices. Such a rear face entrance type radiation detection device can be used as a high-energy radiation detection device.

The moisture-resistant protecting film is not limited to above-mentioned multilayer film, the single layer organic film made of Parylene or the like can be also applied.

As explained in the foregoing, for protecting a highly hygroscopic scintillator, a protective film made of Parylene or the like is formed on the scintillator, and the outer periphery of the protective film is bonded to the light-receiving device array with a resin layer, whereby the scintillator layer is hermetically sealed in accordance with the present invention. In particular, since the peeling from the edges of the protective film is prevented from occurring, resistance to moisture would be improved.

Further, if these edges are covered with a coating resin, the hermetic sealing will further be improved, thus enhancing the resistance to moisture.

In the manufacturing method of the present invention, the protective film is formed and then unnecessary parts thereof are removed, whereby the protective film in a uniform state is formed more easily as compared with the case where the protective film is formed on only necessary parts, while securely exposing the bonding pads. Also, since the protective film penetrates through the gaps among the columnar crystals in the scintillator layer, the adhesion between the protective film and scintillator layer increases. Further, since the thickness of the resin layer provides a cut-in margin for the cutter when cutting, the signal lines for reading out detected signals would not be damaged even when the accuracy of the cutting tool is not enhanced, thereby improving the yield of the product.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radiation detection device comprising;
   a light-receiving device array in which a plurality of light-receiving devices are one- or two-dimensionally arranged on a substrate to form a light-receiving portion, and a plurality of bonding pads electrically connected to said light-receiving devices in respective rows or columns of said light-receiving portion and disposed outside said light-receiving portion;
   a scintillator layer, deposited on said light receiving devices of said light-receiving portion, for converting a radiation into detectable light with said light-receiving device;
   a resin frame made of a resin said resin frame forming a closed frame surrounding said scintillator layer or said bonding pads; and
   a radiation-transmittable, moisture-resistant protective film covering said scintillator layer, and a surface of said light-receiving-device surrounding said scintillator and said resin frame so as to expose at least said bonding pad portion, wherein an edge portion of said moisture-resistant protective film is bonded to said light-receiving device with said resin frame.

2. A radiation detection device according to claim 1, further comprising a coating resin covering said edge portion of said moisture-resistant protective film and said resin frame.

3. A radiation detection device according to claim 1, wherein said moisture-resistant protective film constituted by a multilayer film made of at least two layers including an organic film laminated thereon.

4. A radiation detection device according to claim 1, wherein said multilayer film further including an inorganic film.

5. A radiation detection device according to claim 1, wherein the resin frame is a plurality of resin frames and each resin frame forms a closed frame surrounding said scintillator layer or said bonding pads.

6. A method of making a radiation detection device comprising:
   forming a light-receiving portion, said forming the light-receiving portion comprising:
   one- or two-dimensionally arranging a plurality of light receiving devices and a plurality of bonding pads being electrically connected to said light-receiving devices in respective rows or columns of said light-receiving portion and disposed outside said light-receiving portion on a substrate, and
   depositing a scintillator layer for converting a radiation into detectable light with said light-receiving devices thereon;
   forming a resin frame on said light-receiving device array with a resin, each resin frame forming a closed frame surrounding said scintillator layer or said bonding pads;
   forming a radiation-transmittable, moisture-resistant protective film enveloping said light-receiving device array as a whole;
   cutting said moisture-resistant protective film on the top of said resin frame; and
   removing said moisture-resistant protective film from said bonding pad portion so as to expose said bonding pad portion.

7. A method of making a radiation detection device according to claim 6, further comprising a step of covering edge portions of said moisture-resistant protective film and said resin frame with a resin.

8. A method of making a radiation detection device according to claim 6, wherein said step of forming a moisture-resistant protective film comprising:
   a sub-step forming a radiation-transmittable first organic film such as to envelope said light-receiving device array as a whole; and
   a sub-step of laminating at least one layer of film on said first organic film so as to form a radiation-transmittable, moisture-resistant protective film constituted by a multilayer film made of at least two layers.

9. A method of making a radiation detection device according to claim 8, wherein said multilayer film including at least one inorganic film.

10. A method of making a radiation detection device according to claim 6, wherein the resin frame is a plurality of resin frames and each resin frame forms a closed frame surrounding said scintillator layer or said bonding pads.

* * * * *